(12) United States Patent
Crawley et al.

(10) Patent No.: US 7,855,866 B2
(45) Date of Patent: Dec. 21, 2010

(54) NETWORK INTERFACE WITH TRANSIENT PROTECTION APPARATUS FOR MULTIPLE GROUND PLANES

(75) Inventors: Philip J. Crawley, Sacramento, CA (US); John Camagna, Eldorado Hills, CA (US); Charles Cai, Mather, CA (US)

(73) Assignee: Akros Silicon, Inc., Folsom, CA (US)

( * ) Notice: Subject to any disclaimer, the term of this patent is extended or adjusted under 35 U.S.C. 154(b) by 928 days.

(21) Appl. No.: 11/678,369

(22) Filed: Feb. 23, 2007

(65) Prior Publication Data

US 2008/0144248 A1 Jun. 19, 2008

Related U.S. Application Data

(63) Continuation-in-part of application No. 11/613,156, filed on Dec. 19, 2006, now Pat. No. 7,706,112.

(51) Int. Cl.
*H02H 9/00* (2006.01)
(52) U.S. Cl. .......................................... 361/111; 361/56
(58) Field of Classification Search .................. 361/56, 361/58, 86, 91.1, 111
See application file for complete search history.

(56) References Cited

U.S. PATENT DOCUMENTS

2007/0121832 A1* 5/2007 Ghoshal ................... 379/93.36
2008/0049458 A1* 2/2008 Pozzuoli et al. .......... 363/21.12

* cited by examiner

*Primary Examiner*—Danny Nguyen
(74) *Attorney, Agent, or Firm*—Koestner Bertani LLP

(57) ABSTRACT

A network interface apparatus is disclosed that includes a connector coupled to a plurality of communication lines. A Physical Layer (PHY) device coupled to the communication lines and to a first ground level. A transient event suppression module coupled between the communication lines and a low impedance path to earth ground. During a transient event the transient event suppression module provides a low impedance path to the earth ground to protect the PHY device from the transient event. A power circuit that delivers power from a second ground level to the PHY device is coupled to the first ground level. The first ground level and the second ground level are coupled to provide a low impedance path during normal operation and high impedance during transient events.

23 Claims, 8 Drawing Sheets

NETWORK INTERFACE WITH TRANSIENT PROTECTION APPARATUS FOR MULTIPLE GROUND PLANES

BACKGROUND

Many electronic systems for usage in various applications such as network communications, telecommunications, data transmission, and many others are susceptible to damage resulting from transient energy. Lightning and other transient energy events can create rapid electrical energy transients. Such transient events can damage electronic circuits or equipment. It is common in such instances to use isolating transformers and/or external transient suppressor devices to ensure the sensitive physical (PHY) layer devices are not damaged. In certain cases it may be desirable to remove the transformer and surge suppressor and replace them with non-isolated devices.

Once the isolator is removed it is necessary to provide an alternative means of suppressing surge. This can be accomplished by surge isolating the supply to the sensitive PHY circuit via a power transformer. Some circuit arrangements include two or more circuits that are connected but operate with reference to ground levels that may be different. In response to various conditions, electrical current may flow between different ground domains so that the ground levels can move with respect to one another, which may be a source of common-mode noise. In a communication application, the generated noise creates undesirable emissions that violate regulatory standards.

SUMMARY

In some embodiments, a network interface apparatus is disclosed that includes a connector coupled to a plurality of communication lines. A Physical Layer (PHY) device coupled to the communication lines and to a first ground level. A transient event suppression module coupled between the communication lines and a low impedance path to earth ground. During a transient event the transient event suppression module provides a low impedance path to the earth ground to protect the PHY device from the transient event. A power circuit that delivers power from a second ground level to the PHY device that is coupled to first ground level. The first ground level and the second ground level are coupled to provide a low impedance path during normal operation and high impedance during transient events.

In other embodiments, a transient protection apparatus is disclosed that includes a transient event suppression device coupled between a plurality of communication lines and an ac/dc power block. The ac/dc power block is referenced to earth ground level. A power supply transformer including a secondary winding and a primary winding is coupled to the transient event suppression device. The primary winding is referenced to a power ground level and the secondary winding is coupled to a PHY ground level. A common mode suppression circuit coupled between the communication lines and the power supply transformer. A PHY device coupled between the communication lines and the common mode suppression circuit. The PHY device is referenced to the PHY ground level. A transient protection apparatus coupled between the power ground level and the PHY ground level. The transient protection apparatus is configured to create a short-circuit or low impedance connection between the power ground level and the PHY ground level in normal operation and an open circuit during a transient event. The transient event suppression device creates a low impedance connection sufficient to draw destructive transient energy to earth ground in response to a transient event.

In still further embodiments, a transient event suppression method includes directing energy on a plurality of communication lines through a PHY device coupled to a PHY ground level during normal operation. Transient energy on the plurality of communication lines is directed to earth ground through a transient protection device that is isolated from the PHY device and the PHY ground level during a transient energy event.

BRIEF DESCRIPTION OF THE DRAWINGS

Embodiments of the invention relating to both structure and method of operation may best be understood by referring to the following description and accompanying drawings.

DETAILED DESCRIPTION

A network interface apparatus is disclosed that includes a transient protection apparatus for adaptive impedance control for multiple ground planes according to various disclosed embodiments. The ground levels of a physical layer (PHY) device and a power section are separated via a power transformer in order to create a surge block path through the power plane. The network interface apparatus can be used to protect electronic equipment from potentially harmful transient events and reduce or eliminate common-mode noise that is a result of switching transients in DC/DC converters that flow from the primary side to the secondary side of a power transformer.

Figure 1A:
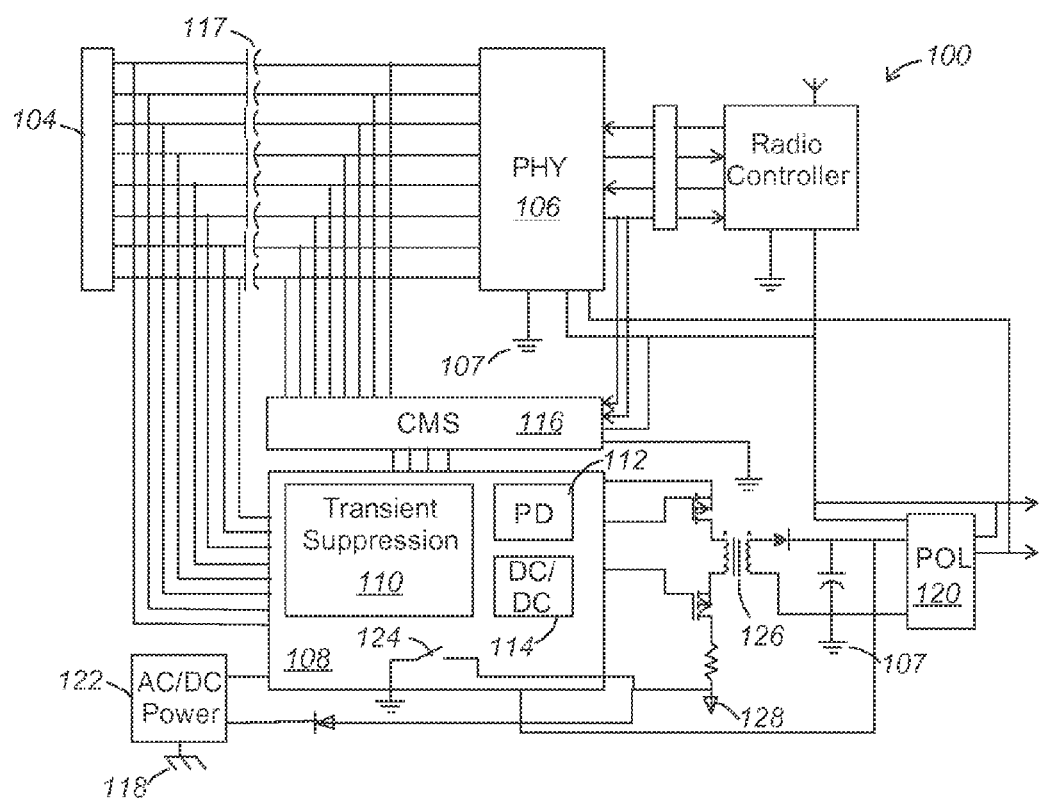
FIG. 1A is a schematic block diagram illustrating an embodiment of a network interface that is configured to provide transient event suppression according to the various disclosed embodiments.

Referring to FIG. 1A, network interface apparatus 100 includes a network connector 104 coupled to Physical Layer (PHY) device 106 via a plurality of signal lines. PHY device 106 is also coupled to a first ground level 107, which may also be referred to as chassis ground level. A power controller device 108 is coupled to the network connector 104 can include a transient suppression device 110, a powered device (PD) controller 112, and a DC-DC converter 114.

Common mode suppression (CMS) circuit 116 can be an active device that is coupled in parallel to transmit and receive differential signal lines connecting PHY device 106 and network connector 104. The CMS circuit 116 may be described functionally as a shunt choke or choke. CMS circuit 116 is connected in parallel to the same signal lines as the Ethernet PHY 106 whereby the shunt choke terminology is descriptive of the parallel connection. The CMS circuit 116 operates as a functional block, coupled in parallel to the signal lines to supply a very low common mode impedance termination. Accordingly, substantially all common mode noise in the network interface apparatus 100 is absorbed by the common mode suppression circuit 116.

A DC isolation barrier 117 can be coupled to the communication lines between the connector 104 and the PHY device 106. The isolation barrier 117 is shown including a plurality of capacitors, but in other embodiments, other suitable devices such as transformers can be used.

Figure 1B:
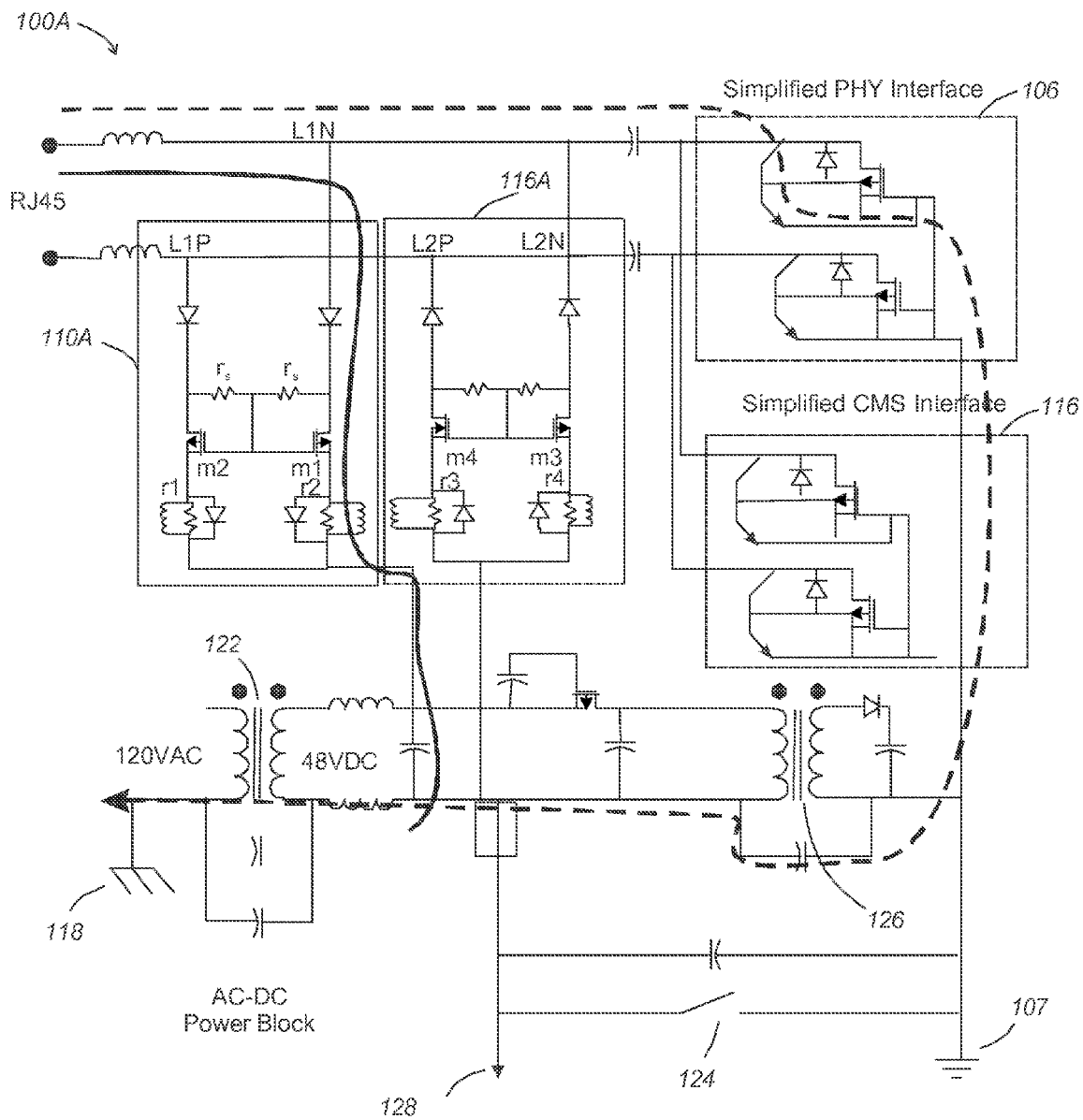
FIG. 1B is a schematic block diagram illustrating an embodiment of electrical paths through the network interface of FIG. 1A during normal operation and during a transient event.

FIG. 1B shows an embodiment of network interface apparatus 100A, with a greater level of detail of some of the components in network interface apparatus 100. Transient event suppression module 110 is shown as a T-connect element 110A coupled between the connector 104 and ac/dc power brick 122. The ac/dc power brick 122 is coupled to earth ground 118, thereby providing a low impedance path to earth ground 118 via T-connect element 110A, as indicated by the dashed line through the T-connect element 110A. The low impedance path to the earth ground 118 protects the PHY device 106 from transient events.

The embodiment of T-connect element 110A shown includes two differential transistor pairs denoted by m1 and m2. Each transistor of the differential transistor pairs is operable to pass an Ethernet power signal. T-connect element 110A further includes a pair of inductors L1, L2, wherein each of the inductors is coupled to a single transistor of the differential transistor pairs. A pair of impedance sense resistors ($r_s$) are coupled between the drains of the differential transistors. The impedance sense resistors are operable to pass Ethernet power signals received from the drain of the coupled transistor. An output node L1, L2 associated with each transistor of the differential transistor pair m1, m2 is configured to provide power to the PHY device 106.

Any suitable type of device or interface can be protected, for example including Universal Serial Bus (USB) interfaces and/or devices, a RETMA standard (RS)-232 interfaces and/or devices, Transmission level 1 (T1) interfaces and/or devices, and others. Accordingly, the network interface apparatus 100 can be used for a variety of physical layer (PHY) devices in a variety of applications.

The PHY device 106 is coupled between the communication lines and the common mode suppression (CMS) circuit 116A. A power circuit 126 includes a power supply transformer with a primary winding and a secondary winding. The primary winding is coupled to the transient event suppression device 110A and referenced to a power ground level 128. The secondary winding is coupled to a PHY ground level 107. The power circuit 126 delivers power from the PHY ground level 107 to the PHY device 106. The PHY device 106 is also referenced to the power ground level 128. Note that in some embodiments, a magnetic transformer of conventional systems may be eliminated while transformer functionality is maintained. Techniques enabling replacement of the transformer may be implemented in the form of integrated circuits (ICs) or discrete components. Examples of such devices, including an autoformer device, that can be used in addition to or instead of a magnetic transformer are further described in U.S. patent application Ser. No. 11/279,322 entitled "Network Devices for Separating Power and Data Signals", filed Apr. 11, 2006, and incorporated herein by reference.

The power ground level 128 and the PHY ground level 107 are coupled to provide a low impedance path during normal operation and high impedance during transient events. Transient protection apparatus 124 is coupled between the power ground level 128 and the PHY ground level 107 and operates to create an open circuit up to a voltage sufficient to fully turn on the T-connect element 110A. Transient protection apparatus 124 subsequently operates to become a short-circuit to enable passing strikes from the T-connect element 110A to form a discharge path, directing the strikes away from an undesired path through PHY device 106. The transient protection apparatus 124 is thus configured to create a low impedance connection between the power ground level 128 and the PHY ground level 107 in normal operation and a high impedance connection between the power ground level 128 and the PHY ground level 107 during a transient event.

Figure 1C:
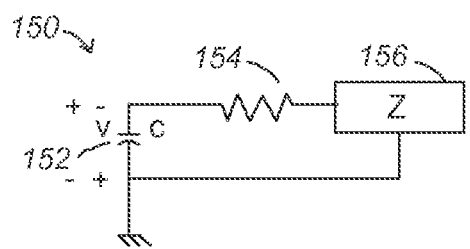
FIG. 1C is a schematic diagram of a generalized stressing circuit that can be used to explain the cause of stress from a transient event in a system, such as network interface apparatus FIG. 1A.

FIG. 1C shows a generalized stressing circuit 150 that can be used to explain the cause of stress from a transient event in a system, such as network interface apparatus 100A. All stressing circuits use capacitive storage devices, represented by capacitor 152, to set the energy level of the stress from a transient energy event. The higher the voltage of the event and the capacitance of the system, generally the higher the stress from the event. Series resistance, represented by resistor 154, limits the peak current of the stress. Note that the thermal stress created is generally proportional to the peak current. Additional components 156 in the system 150 can be used to shape the pulse. The level of stress is typically proportional to the rate of increase of the current in the system 150. Additionally, transient events can occur in negative and positive directions relative to the components of system 150.

Figure 1D:
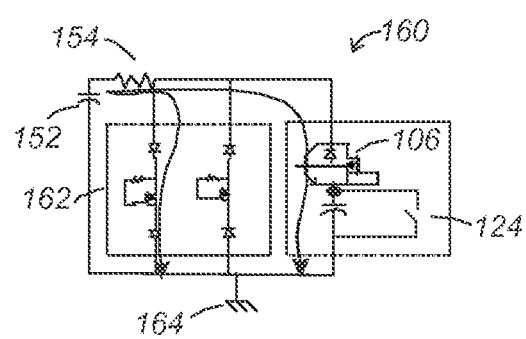
FIGS. 1D and 1E show an embodiment of system including a T-connect element connected to earth ground to limit energy through a PHY device during a transient energy event.
Figure 1E:
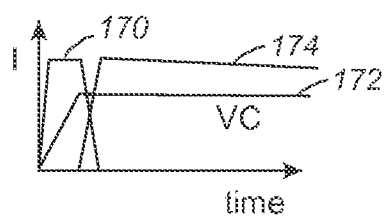

A pathway through the T-connect element 110A forms a DC path for current that limits energy through the PHY device 106. The T-connect element 110A and the PHY 106 are referenced to different ground levels. Referring to FIGS. 1D and 1E, an embodiment of system 160 is shown including a T-connect element 162 connected to earth ground 164 to limit energy through PHY device 106 during a transient energy event. The T-connect element 162 is sized to handle both surge current and Power-over-Ethernet current feed. During a surge event, the T-connect element 162 will start to turn on, typically in less than 1 nanosecond. Transient protection apparatus 124 operates to limit energy through the PHY device 106 to approximately 1 percent of the energy of the stress event. FIG. 1E shows a time history of current through components in system 160 over time during a transient energy event. When the strike initially occurs, as indicated by graph 170, current flows to PHY device 106, as indicated by graph 172. Once the current across capacitor 152 rises to a specified level during the stress event, T-connect element 162 begins conducting, as indicated by graph 174, providing a low impedance path to earth ground 164. For even a relatively high level of cross-ground capacitance, for example 500 pF, the T-connect element 110A turns on rapidly, for in example in about 2 nanoseconds or less. The energy from the transient event is thus directed away from the PHY device 106 while the current remains at the specified level.

Figure 2:
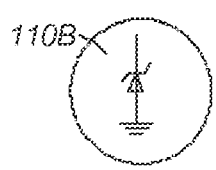
FIG. 2 is a schematic block diagram illustrating an embodiments of other devices that can be used for the transient event suppression module of FIG. 1A.
Figure 2:
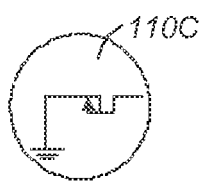
Figure 2:
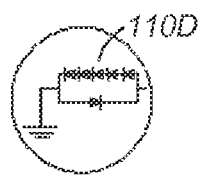

Other devices that can be used for transient event suppression module 110 are shown in FIG. 2. One embodiment depicts a zener diode 110B coupled to local ground. In some embodiments, a zener diode can have a forward-biased diode. Another example that can be used in place of zener diode protection is an active device 110C such as an N-channel MOS (NMOS) device with a gate tied to ground. In another example of an active shunt device, a parasitic bipolar device can enable a snap back operation to enable protection. A further example is a stack of diodes coupled in series 110D coupled in parallel with another diode.

Referring again to FIG. 1A, in absence of a clamping capability of the transient protection apparatus 124, current flows through the PHY 106. Current initially flows into the PHY 106 and then switches to the transient event suppression module 110, thereby moving the ground levels apart. In a typical configuration, the amount of current for a positive strike is larger than for a negative strike. A clamping circuit in the transient protection apparatus 124 can be used to internally limits current, thereby limiting current through the PHY 106 and the T-connect element 110A. The clamping circuit functions to saturate and limit current. Current through the PHY 106 predominantly results from capacitance between the grounds.

Figure 3A:
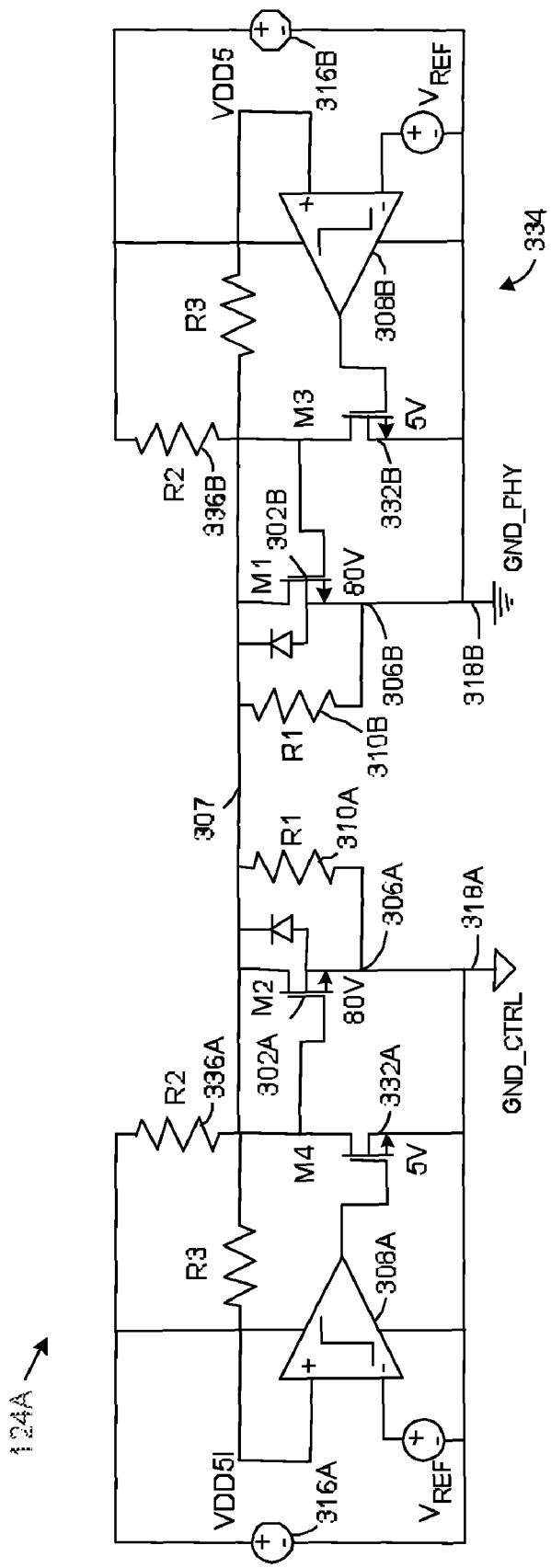
FIGS. 3A and 3B are schematic block diagrams depicting embodiments of an electronic apparatus that can be used to help protect electronic equipment from potentially harmful transient events and reduce or eliminate noise resulting from current flow between different supply domains while allowing current flow to reduce common-mode emissions.

Referring to FIG. 3A, a schematic block diagram depicts an embodiment of an electronic apparatus 124A that can be used as the transient protection apparatus 124 in FIG. 1. Apparatus 124A incorporates a clamping circuit that operates to protect electronic equipment from potentially harmful transient events and reduce or eliminate common-mode noise that is a result of switching transients in DC/DC converters that flow from the primary side to the secondary side of the power transformer. The electronic apparatus 124A can comprise first 302A and second 302B Metal Oxide Semiconductor Field Effect Transistor (MOSFET) enhancement mode devices that are coupled respectively in series between first 304A and second 304B supply domains and coupled to respective first 306A and second 306B nodes. First 308A and second 308B active circuits are coupled to gates of the respective first 302A and second 302A MOSFET enhancement mode devices and operate to close the respective device in low current/voltage conditions while opening the respective device for large currents.

The MOSFETs 302A and 302B operate as switches that are closed for low currents and/or voltages and open for large DC and/or transient currents under control of the active circuits 308A, 308B. The active circuits 308A, 308B are connected to control the switches 302A and 302B and reference to ground domains that can be different. In the illustrative embodiment, the grounds can be described as a control ground (GND_CTRL) which corresponds to an output node or pin and a physical layer (PHY) ground (GND_PHY) which corresponds to an input node or pin.

In a different implementation, instead of a direct ground level a high-voltage capacitor can be used to connect either ground side potential to allow isolation while maintaining low impedance to reduce common-mode noise. Various circuits disclosed herein can be used to provide an isolated supply potential.

The illustrative electronic apparatus 124A includes active devices and accordingly is a powered circuit, as distinguished from circuits using depletion-mode devices that can be non-powered. The use of active devices enables integration into a much wider range of process technologies where depletion mode devices are not generally available. For clarification of definitions herein, note that native MOSFET transistors in some processes under certain conditions are called depletion mode devices but would still require active gate control to provide good performance. Such devices are defined as "enhancement mode" devices since threshold voltages are not sufficiently negative to be used without power. The illustrative embodiment of the electronic apparatus 124A can be configured for high voltage application. Voltages between the grounds 318A and 318B can move a relatively large voltage apart. In a particular embodiment, the grounds can move 60-70 volts apart, although other configurations can operate at different levels. The shunting circuit that sets the voltage movement of the grounds can be the TlessConnect™ circuit described hereinafter.

First 310A and second 310B circuits can be coupled across the respective first 302A and second 302A MOSFET enhancement mode devices in a configuration such that removal of a transient condition returns the short-circuit or low impedance connection between the first 306A and second 306B nodes, thereby returning to normal operation. Circuits 310A and 310B ensure that once a condition is removed, ground level for the two references returns concurrently. The circuit can be designed, for example by selection of resistors 336A and 336B, for fast opening and slow closing of the switches 302A, 302B, for example using the resistors 336A and 336B rather than directly driving switches. In the illustrative embodiment, the circuits 310A and 310B are depicted as resistors 310A and 310B that return the circuit to low impedance operation. Use of resistors enables control of impedance in a relatively simple implementation. Other embodiments, the control circuits can be arranged to detect removal of the transient condition and returns the short-circuit or low impedance connection between the first and second nodes and normal operation. A protection circuit can be constructed to return to the short-circuit or low impedance condition by monitoring output and input nodes for detection of a condition that either the current or voltage transient has diminished. An active circuit can be controlled that returns the switches 302A, 302B to normal operation.

The electronic apparatus 124A can be configured to rapidly drive impedance between the first 306A and second 306B nodes high in response to the transient event while returning to a short-circuit or low impedance connection between the first 306A and second 306B nodes when the transient event has ceased. Thus, the illustrative electronic apparatus 124A is configured to handle large current transients. Inherent in a MOSFET transistor is a transient limiting capability that arises because once current in the transistor is sufficiently large, the drain-to-source voltage rises to the point that the transistor will saturate, enabling a first level of surge protection that is inherently extremely fast-acting. The transient limiting capability protects against electrostatic discharge (ESD) events such as those defined in International Electrotechnical Commission (IEC) standard 61000-4-2, which have very high current, for example as much as 30A, and short durations. Active shutting off of devices is more pertinent for slow acting but longer duration events such as events defined in IEC 61000-4-5.

The first 316A and second 316B power supplies are independent and DC isolated from one another with power to operate the circuit continuous even during the surge event.

The active devices 308A, 308B are depicted as comparators. In normal operation, as long as the voltage at the centerpoint 307 is lower than a predetermined reference voltage which is set by the comparators 308A, 308B, the electronic apparatus 124A remains in normal operation. Under conditions of a strong surge or stress event, then the voltage at point 307 is elevated and one of the two comparators 308A, 308B is activated and shuts off the relatively large MOSFET device 302A or 302B that is controlled by the activated comparator. The comparators 308A, 308B control the large MOSFETs 302A, 302B through low or medium size transistors 332A, 332B to facilitate switching and overcoming the parasitic diodes that can be inherent in the back-to-back MOSFETs 302A, 302B which are coupled in series.

In some embodiments, the electronic apparatus 124A can be configured as a generic protection device rather for a particular application. In a specific example embodiment, the high voltage MOSFETs 302A, 302B can be 80 volt devices and the low or middle voltage transistors 332A and 332B can be 5 volt devices.

In some embodiments, the electronic apparatus 124A can be formed using a silicon-on-insulator (SOI) process. In other embodiments, the electronic apparatus 124A can be formed using a junction-isolated process. Various other processes may also be suitable. The electronic devices 124A and 124B are typically a highly suitable application for the silicon-on-insulator (SOI) process. The silicon-on-insulator (SOI) process reduces the amount of electrical charge that a transistor moves during a switching operation, thereby increasing switching speed and reducing switching energy over other processes such as CMOS. SOI differs from generic CMOS in that a silicon junction is located above an electrical insulator so that the insulator reduces capacitance. Thus, a transistor can switch after a smaller amount of charging, thereby reducing switching time, elevating resistance to latch-up, and reducing leakage. The SOI process also allows higher voltages between the input and output nodes, due to parasitic devices breakdown voltages, than would be allowed on a standard junction isolated process. In some configurations, a deep nwell CMOS process can potentially provide isolation that would be sufficient for a lower voltage application, such as applications in embodiments shown hereinafter.

Figure 3B:
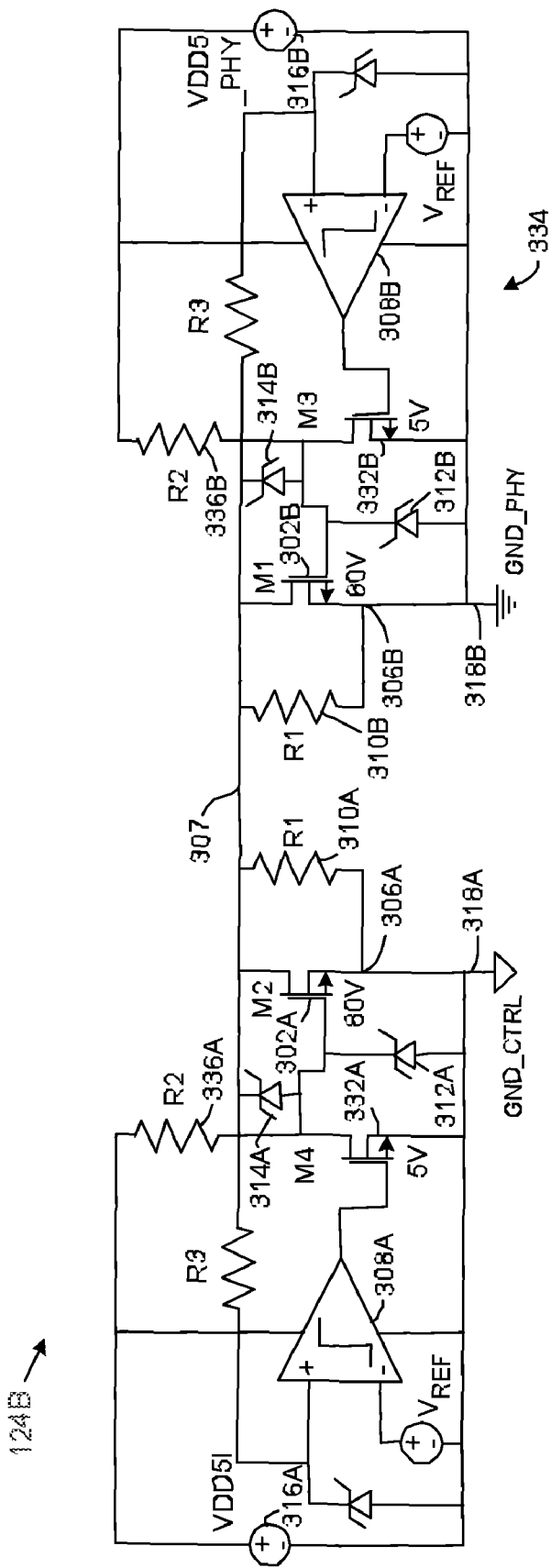

FIGS. 3A and 3B depict embodiments wherein multiple independent supplies 316A, 316B are available to the circuit, and illustrate example techniques for coupling the independent supplies 316A, 316B. Referring to FIG. 3B, a schematic block diagram shows another embodiment of an electronic apparatus 124B that can be used for transient protection, node suppression, and the like. The electronic apparatus 124B can comprise one or more shunt devices 312A coupled from the first node 306A to a point that has low impedance to an earth ground reference 318 for shunting transient event energy to the earth ground reference 318A. The shunt devices 312A, 312B, 314A, 314B can be coupled around the MOSFETs 302A, 302B in compliance with Joint Electron Device Engineering Council (JEDEC) specifications, for example JEDEC 2000V ESD chip level specifications, while still limiting system level surge events. Such JEDEC compliance ensures that the devices can handle transient events before assembly into a system.

Some embodiments may further comprise one or more shunt devices 312B coupled between the second active circuit 308A and the second MOSFET enhancement mode device 302B and can be controlled by the second active circuit 308B for shunting transient event energy to a ground reference 318B. FIG. 3B depicts the shunt devices 312A, 312B, 314A, and 314B as single zener diodes. Other embodiments may implement any suitable configuration, such as multiple diodes in series or parallel, which can be selected on the basis of various considerations such as process technology.

In various embodiments and arrangements, the shunt devices can be selected from among zener diodes, avalanche diodes, diode stacks, snapback metal oxide semiconductor field effect transistor (MOSFET)s, a Silicon-Controlled Rectifier (SCR) thyristors, other transient suppressor circuits, or the like.

Referring again to FIGS. 3A and 3B, further embodiments of an apparatus 124A,B for transient protection are illustrated. An apparatus electrically couples first and second nodes in respective first 304A and second 304B supply domains, which are referenced to ground levels 318A and 318B that can be different. The apparatus 124A comprises first 302A and second 302B high voltage devices coupled in parallel to first 332A and second 332B low and/or medium voltage devices, respectively. The first 302A and second 302B high voltage devices are controlled by signals respectively referenced to the first 304A and second 304B supply domains.

The apparatus 124A,B can further comprise a controller 334 coupled to the first 302A and second 302B high voltage devices and the first 332A and second 332B low and/or medium voltage devices. The controller 334 can be controlled by the signals that are respectively referenced to the first 304A and second 304B supply domains to create a short-circuit or low impedance connection between the first 306A and second 306B nodes in normal operation and increase impedance between the first 306A and second 306B nodes sufficiently to isolate against destructive transient energy in response to a transient event.

For example, the apparatus 124A,B can include a controller 334 that comprises first 308A and second 308B comparators coupled respectively to the first 302A and second 302B high voltage devices and the first 332A and second 332B low and/or medium voltage devices. The first 308A and second 308B comparators are controlled by the signals respectively referenced to the first 304A and second 304B supply domains to create a short-circuit or low impedance connection between the first and second nodes in normal operation and increase impedance between the first and second nodes sufficiently to isolate against destructive transient energy in response to a transient event.

The apparatus 124A,B can further comprise first 310A and second 310B resistors respectively coupled across the first 302A and second 302B high voltage devices so that removal of a transient condition returns the short-circuit or low impedance connection to node 307 in normal operation.

One or more shunt devices 312 can be coupled to at least one of the first 302A and second 302B high voltage devices for shunting transient event energy to an earth ground reference 318. In various embodiments and arrangements, the shunt devices 312 can be selected from among zener diodes, avalanche diodes, diode stacks, snapback metal oxide semiconductor field effect transistor (MOSFET)s, a Silicon-Controlled Rectifier (SCR) thyristors, other transient suppressor circuits, or the like.

The apparatus 124A can be constructed using any suitable process, for example a silicon-on-insulator process, a junction isolated process, or another process.

The apparatus 124A can operate to rapidly drive impedance between the first 306A and second 306B nodes high in response to the transient event and return to the short-circuit or low impedance connection between the first 306A and second 306B nodes when the transient event has ceased.

The first 306A and second 306B nodes can be respectively powered by first 316A and second 316B power supplies that are held in substantially independent isolation by the apparatus 124A whereby circuits referenced to the respective first 304A and second 304B supply domains are supplied with power constantly including during the transient event.

In accordance with a specific embodiment of an electronic apparatus 124A shown in FIG. 3A, first 302A and second 302B Metal Oxide Semiconductor Field Effect Transistor (MOSFET) depletion mode devices can coupled respectively in series between first 304A and second 304B supply domains and coupled to first 306A and second nodes 306B. The electronic apparatus 124A can further comprise first 308A and second 308B active circuits coupled to gates of the respective first 302A and second 302B MOSFET depletion mode devices, thereby operating to close the appropriate device for a low current/voltage condition and open the device for large currents.

In accordance with another specific embodiment of an electronic apparatus 124A shown in FIG. 3A, first 302A and second 302B Junction Field Effect Transistor (JFET) devices coupled respectively in series between first 304A and second 304B supply domains and coupled to respective first 306A and second 306B nodes. First 308A and second 308B active circuits can be coupled to gates of the first 302A and second 302B JFET devices, thereby functioning to close the appropriate device for a low current/voltage condition and open the device for large currents.

Referring again to FIG. 3A, a further embodiment of an apparatus 124A for transient protection is shown. An apparatus 124A electrically couples first 306A and second 306B nodes in respective first 304A and second 304B supply domains coupled through low impedance to separate ground levels. The apparatus 124A comprises first 302A and second 302B active devices controlled by signals respectively referenced to the first 304A and second 304B supply domains and create a short-circuit or low impedance connection between the first 306A and second 306B nodes in normal operation and increase impedance between the first 306A and second 306B nodes sufficiently to isolate against destructive transient energy in response to a transient event.

Figure 4A:
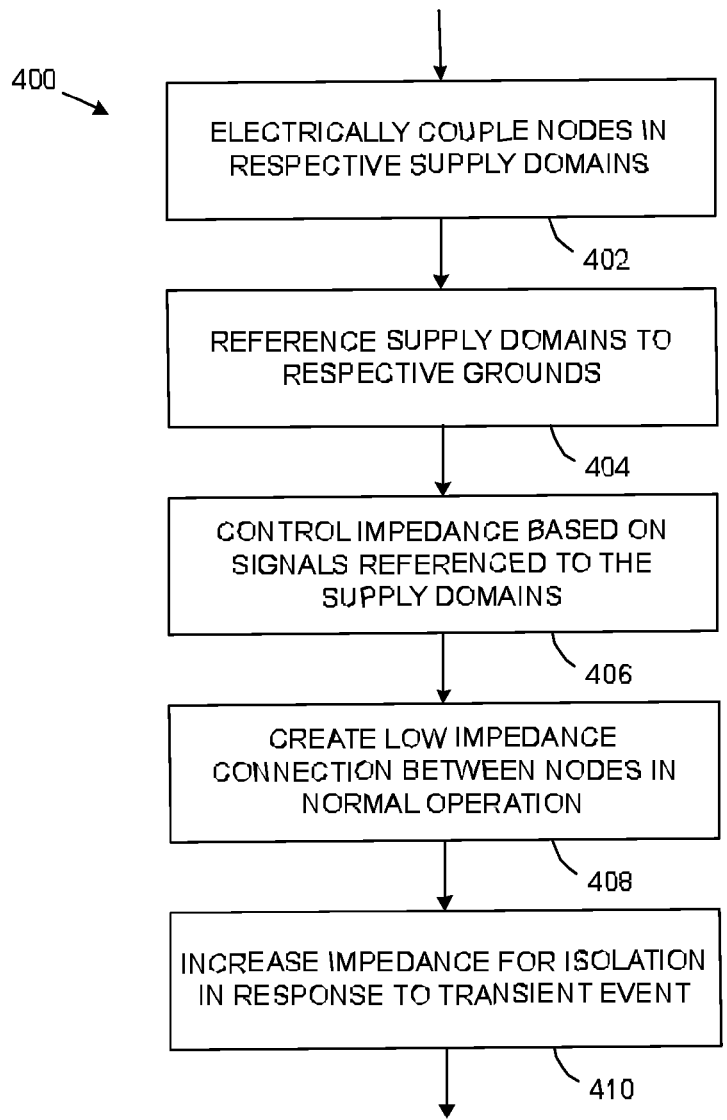
FIGS. 4A, 4B, and 4C are schematic flow charts illustrating an embodiment of a transient protection method for protecting an electronic system against transient energy and suppressing noise.
Figure 4B:
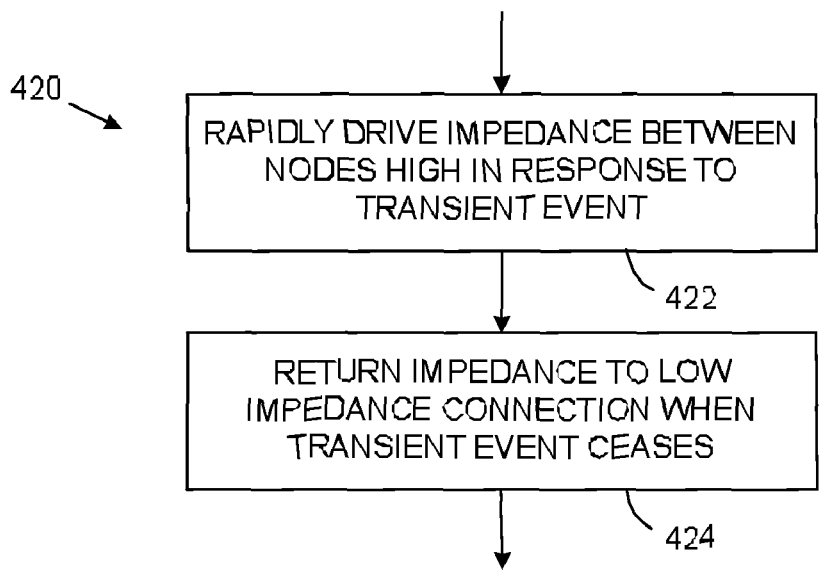
Figure 4C:
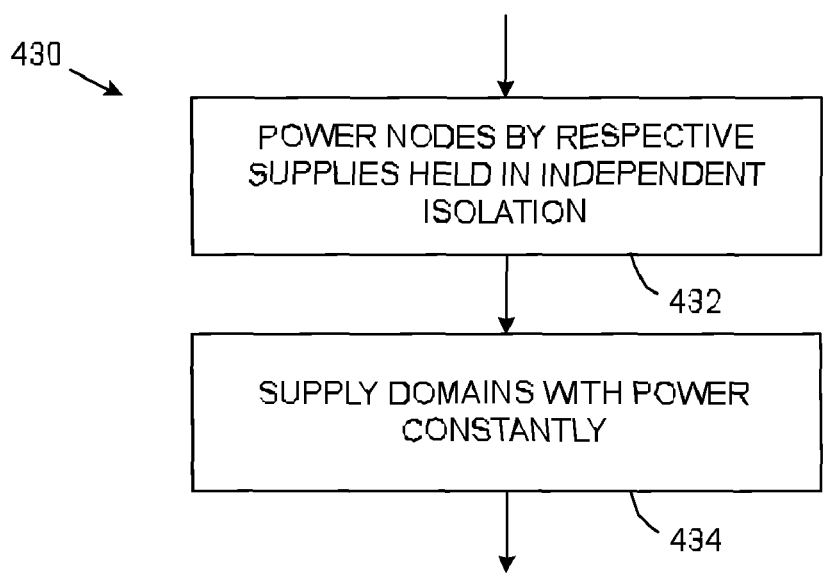

Referring to FIGS. 4A, 4B, and 4C, schematic flow charts illustrate an embodiment of a transient protection method 400 for protecting an electronic system against transient energy and suppressing noise. As shown in FIG. 4A, the method 400 comprises electrically coupling 402 first and second nodes in respective first and second supply domains and referencing 404 the first and second supply domains to ground levels that can be different. The transient suppression module is coupled 406 to earth ground. A switch is opened 408 to separate the respective grounds referenced to the supply domains. Once the switch is opened, the transient energy is conducted 410 to earth ground. When the transient event is over, the switch is closed 412 to couple the respective grounds back together during regular operation.

Referring to FIG. 4B, in some embodiments a method 420 can include rapidly driving 422 impedance between the first and second nodes high in response to the transient event. In contrast, impedance can be returned 424 to the short-circuit or low impedance connection between the first and second nodes when the transient event has ceased.

Referring to FIG. 4C, the first and second nodes can be powered 432 by respective first and second power supplies that are held in substantially independent isolation. The method 430 can further comprise supplying 434 the respective first and second supply domains with power constantly, even during the transient event.

Figure 5:
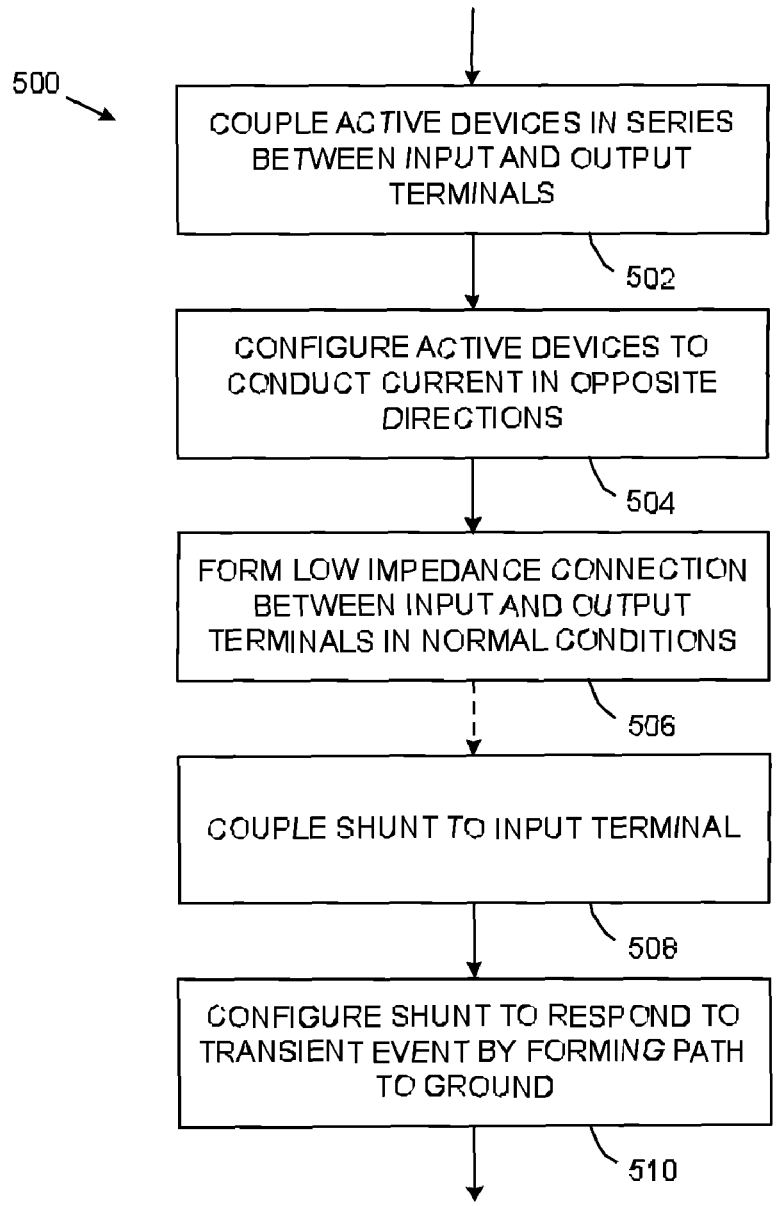
FIG. 5 is a schematic flow chart depicting an embodiment of a method electronic devices and components against transient energy.

Referring to FIG. 5, a schematic flow chart depicts an embodiment of a method 500 electronic devices and components against transient energy. The illustrative transient event protection method 500 can comprise coupling 502 first and second active semiconductor devices in series between an input terminal and an output terminal and configuring 504 the first and second active semiconductor devices to conduct current in opposite directions. The first and second active semiconductor devices are controlled 506 to create a short-circuit or low impedance connection between the input terminal and the output terminal in normal operation and increase impedance between the input terminal and the output terminal sufficiently to isolate against destructive transient energy in response to a transient event.

In some applications, a shunt can be coupled 508 to the input terminal. The shunt can be configured 510 to respond during a transient event by forming a pathway for shunting transient energy to a local ground.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network interface apparatus comprising:
   a connector coupled to a plurality of communication lines;
   a Physical Layer (PHY) device coupled to the communication lines and to a first ground level;
   a transient event suppression module coupled between the communication lines and a low impedance path to earth ground, wherein during a transient event the transient event suppression module provides a low impedance path to the earth ground to protect the PHY device from the transient event; and
   a power circuit that delivers power from a second ground level to the PHY device that is coupled to first ground level, wherein the first ground level and the second ground level are coupled to provide a low impedance path during normal operation and high impedance during transient events.

2. The apparatus according to claim 1 further comprising:
   a DC isolation barrier coupled between the connector and the PHY device.

3. The apparatus according to claim 2 wherein the isolation barrier includes a plurality of capacitors.

4. The apparatus according to claim 2 wherein the isolation barrier includes a plurality of transformers.

5. The apparatus according to claim 1 wherein the transient event suppression module includes a solid-state inductance boosting autoformer device.

6. The apparatus according to claim 1 further comprising:
an ac/dc power brick, wherein the first ground level has a low impedance for transient event to the earth ground of the ac/dc power brick.

7. The apparatus according to claim 1 wherein:
the interface is selected from a group consisting of a Universal Serial Bus (USB) interface, a RETMA standard (RS)-232 interface, a Transmission level 1 (T1) interface, a 10/100/1/10 GB Ethernet communication interface, and a communication interface.

8. The apparatus according to claim 1 further comprising:
a common mode suppression module coupled between the communication lines and the transient protection module, and between the PHY device and a power transformer.

9. The apparatus according to claim 1 further comprising:
a limit resistor coupled between the first ground level and the power ground level.

10. The apparatus according to claim 1 wherein:
the transient event suppression module includes a transformer.

11. The apparatus according to claim 1 wherein:
the second ground level is coupled to the first ground level via a surge limiting circuit.

12. The apparatus according to claim 1 wherein:
the surge limiting circuit includes at least one of the group consisting of: a Positive Temperature Coefficient (PTC) device, a zener diode, a zener diode including a forward-biased diode, a N-channel MOS (NMOS) device with a gate tied to the earth ground, a parasitic bipolar device configured to enable a snap back operation to enable protection; and a stack of diodes coupled in series and coupled in parallel with another diode.

13. The apparatus according to claim 5 wherein:
the apparatus is an Ethernet network device operable to receive both a power signal and a data signal through a coupled Ethernet network,
the transient event suppression module is implemented in an integrated circuit (IC) coupled to the connector, and
the power circuit is operable to:
pass the received data signal to the PHY device, and
at least partially power the Ethernet network device from the received power signal.

14. A transient protection apparatus comprising:
a transient event suppression device coupled between a plurality of communication lines and an ac/dc power block, wherein the ac/dc power block is referenced to earth ground level;
a power supply transformer including a secondary winding and a primary winding coupled to the transient event suppression device, wherein the primary winding is referenced to a power ground level and the secondary winding is coupled to a PHY ground level;
a common mode suppression circuit coupled between the communication lines and the power supply transformer;
a PHY device coupled between the communication lines and the common mode suppression circuit, wherein the PHY device is referenced to the PHY ground level;
a transient protection apparatus coupled between the power ground level and the PHY ground level, wherein the transient protection apparatus is configured to create a short-circuit or low impedance connection between the power ground level and the PHY ground level in normal operation and an open circuit during a transient event; and
the transient event suppression device creates a low impedance connection sufficient to draw destructive transient energy to earth ground in response to a transient event.

15. The apparatus according to claim 14 wherein the power circuit includes:
two differential transistor pairs wherein each transistor of the differential transistor pairs is operable to pass an Ethernet power signal;
two pairs of inductors, wherein each of the inductors is coupled to a single transistor of the differential transistor pairs; and
a pair of impedance sense resistors coupled between drains of the differential transistor pair, wherein the impedance sense resistors are operable to pass Ethernet power signals received from a drain of the coupled transistor.

16. The apparatus according to claim 15 further comprising:
a pair of output nodes, wherein one output node is associated with each of the differential transistor pairs, and wherein the pair of output nodes provide power to an Ethernet network powered device.

17. A transient event suppression method comprising:
directing energy on a plurality of communication lines through a PHY device coupled to a PHY ground level during normal operation;
directing transient energy on the plurality of communication lines to earth ground through a transient protection device that is isolated from the PHY device and the PHY ground level during a transient energy event; and
directing the energy during normal operation through a common mode suppression (CMS) module, wherein the CMS module is coupled between the PHY device and the PHY ground level.

18. The method of claim 17 further comprising:
using a T-connect element as the transient protection device.

19. The method of claim 17 further comprising:
coupling the PHY ground level and a power ground level to a current limiting device.

20. The method of claim 17 further comprising:
electrically coupling first and second nodes in respective first and second supply domains;
referencing the first and second supply domains to ground potentials that can be different.

21. The method according to claim 20 further comprising:
rapidly driving impedance between the first and second nodes high in response to the transient event; and
returning to the short-circuit or low impedance connection between the first and second nodes when the transient event has ceased.

22. The method according to claim 20 further comprising:
powering the first and second nodes by respective first and second power supplies that are held in substantially independent isolation;
supplying the respective first and second supply domains with power constantly including during the transient event.

23. The method of claim 17 further comprising:
coupling the earth ground level through an AC/DC power block.

* * * * *